United States Patent [19]

Brendzel

[11] 3,816,734

[45] June 11, 1974

[54] APPARATUS AND METHOD FOR 2'S COMPLEMENT SUBTRACTION

[75] Inventor: Henry Tzvi Brendzel, Parsippany, N.J.

[73] Assignee: Bell Telephone Laboratories, Incorporated, Berkeley Heights, N.J.

[22] Filed: Mar. 12, 1973

[21] Appl. No.: 340,213

[52] U.S. Cl. .................. 235/168, 235/175, 235/176

[51] Int. Cl. .......................................... G06f 7/385

[58] Field of Search ........... 235/168, 173, 174, 175, 235/176

[56] References Cited

UNITED STATES PATENTS

| | | | |
|---|---|---|---|
| 3,437,801 | 4/1969 | Wilhelm | 235/176 X |
| 3,584,206 | 6/1971 | Evans | 235/176 X |
| 3,631,231 | 12/1971 | Lagemann | 235/176 |
| 3,699,326 | 10/1972 | Kindell et al. | 235/175 |

OTHER PUBLICATIONS

Langdon, "Subtraction by Minuend Complementation," IEEE Trans. On Comp., Jan. 1969, pg. 74–76.

*Primary Examiner*—Charles E. Atkinson
*Assistant Examiner*—James F. Gottman
*Attorney, Agent, or Firm*—R. O. Nimtz

[57] ABSTRACT

This invention is a method and apparatus for performing 2's complement subtraction. Each bit of the minuend is first inverted and then added to the corresponding bit of the subtrahend. Carries out of the most significant bit, the sign bit, are ignored. The resulting bits which have been added are then inverted, yielding the desired difference in 2's complement form.

4 Claims, 5 Drawing Figures

FIG. 1

| | DECIMAL NUMBER +13 | DECIMAL NUMBER −13 | DECIMAL NUMBER +7 | DECIMAL NUMBER −7 |
|---|---|---|---|---|
| SIGNED MAGNITUDE | 0,01101 | 1,01101 | 0,00111 | 1,00111 |
| SIGNED 1'S COMPLEMENT | 0,01101 | 1,10010 | 0,00111 | 1,11000 |
| SIGNED 2'S COMPLEMENT | 0,01101 | 1,10011 | 0,00111 | 1,11001 |

APPARATUS AND METHOD FOR 2'S COMPLEMENT SUBTRACTION

GOVERNMENT CONTRACT

The invention herein claimed was made in the course of or under a contract with the Department of the Navy.

BACKGROUND OF THE INVENTION

1. Field of the Invention

This invention relates to a method and apparatus for subtracting one number from another where both numbers, and the resulting difference number, are all represented in signed 2's complement notation.

2. Description of the Prior Art

Recent years have seen an enormous growth in the field of digital technology. An important segment of this technology is that of performing arithmetic operations on digital signals which represent numbers. The term "digital" usually means that the circuitry involved logically connects elements which are either "on" or "off" or which have two "states," a 1 state or a 0 state. This two-state circuitry is said to deal with binary signals, 1's or 0's.

Binary signals are useful in representing numbers. The binary number system is such that a sequence of 1's or 0's, or "bits," represents any common decimal number. For example, the decimal number 13 is represented in binary as 01101. The rule for translating from the binary system to the decimal number system is to multiply each 1 or 0 by $2^m$, where $m$ represents the place in the sequence each bit occupies. For the least significant bit, $m = 0$, the next significant bit, $m = 1$, etc. For the example 01101, the decimal number is found by $(0 \times 2^4 + 1 \times 2^3 + 1 \times 2^2 + 0 \times 2^1 + 1 \times 2^0) = (0 + 8 + 4 + 0 + 1) = 13.$ Several different ways have been found to accomplish the representation of negative numbers in binary form. Among those in common use are signed magnitude, signed 2's complement, and signed 1's complement. FIG. 1 illustrates the different representations for the decimal numbers +13, −13, +7, and −7. In all three representations, the most significant bit is a sign bit. The + sign is represented by a 0, while the − sign is represented by a 1. Positive numbers are represented in the same way in all three systems (e.g., representations of +13 and +7 in FIG. 1).

Negative numbers are represented differently. The signed magnitude representation merely represents the decimal number in binary, and designates the most significant bit as a 1 to indicate a negative sign. The decimal number −7 is represented as 1,00111, the most significant bit being the negative sign bit, the other bits corresponding to binary 7. The signed 1's complement representation follows immediately by inverting each bit except the sign bit of the signed magnitude representation: 1,111000. This representation is called 1's complement and is found by the relation $(2^n - 1 - N)$, where N is the decimal equivalent of the binary representation, and $n$ is the number of significant bits. For this case, $(2^5 - 1 - 24) = (32 - 25) = 7$, the sign bit indicating that 1,11000 represents −7 in decimal.

The 2's complement representation is generated from the 1's complement representation by adding a 1 to the least significant bit. Thus, −7, in signed 2's complement representation, is 1,11001. The decimal equivalent is found by $(2^n - N) = [2^5 - (2^4 + 2^3 + 2^0)] = [32–25] = -7$.

Prior art subtractors perform subtraction in the 2's complement system by (1) inverting each bit of the subtrahend, (2) adding the inverted subtrahend to the minuend, neglecting any carry out of the sign bit, and (3) adding a 1 to the least significant digit of the result. FIG. 2 shows, in block diagram form, the prior art method for performing 2's complement subtraction. The method is explained in *The Logic of Computer Arithmetic*, by Ivan Flores, Prentice-Hall, 1963, at page 40.

Signed 2's complement subtraction units are useful in arithmetic units of general purpose digital computers, as well as in special purpose applications. 2's complement subtraction can be used with either parallel or serial arithmetic operations. Parallel operation implies the use of a hard-wired full-adder circuit for each bit. Each adder is operated simultaneously, with the provision for subsequent carries to propagate from one bit position to another. Serial operation implies the use of one adder stage, where one adder stage is used first to add the two least significant bits, store the result in an output register, insert any carry produced into the carry input of the adder, and shift the next two bits in to be added. The operation is repeated until all bits have been added.

Thus, both serial and parallel designs for 2's complement subtractors require that provision be made for adding a unit pulse to the least significant digit. The unit pulse can be added during or after the addition of the minuend to the inverted subtrahend. The prior art requirement of adding a unit pulse to the least significant digit as a step in the subtraction method necessitates expensive circuitry, (1) to generate the pulse and (2) to control the timing of the extra addition step.

It is an object of this invention to provide a method and apparatus for 2's complement subtraction without providing for the adding of a unit pulse.

SUMMARY OF THE INVENTION

This object is achieved in accordance with this invention by providing a method and apparatus such that each bit of the minuend is inverted and added to each bit of the subtrahend. Each resulting bit is then inverted to achieve the desired difference in signed 2's complement form.

BRIEF DESCRIPTION OF THE DRAWINGS

FIG. 1 shows the relationship among signed magnitude, signed 1's complement, and signed 2's complement number systems when they represent positive and negative decimal numbers;

DESCRIPTION OF THE INVENTION

Figure 2:
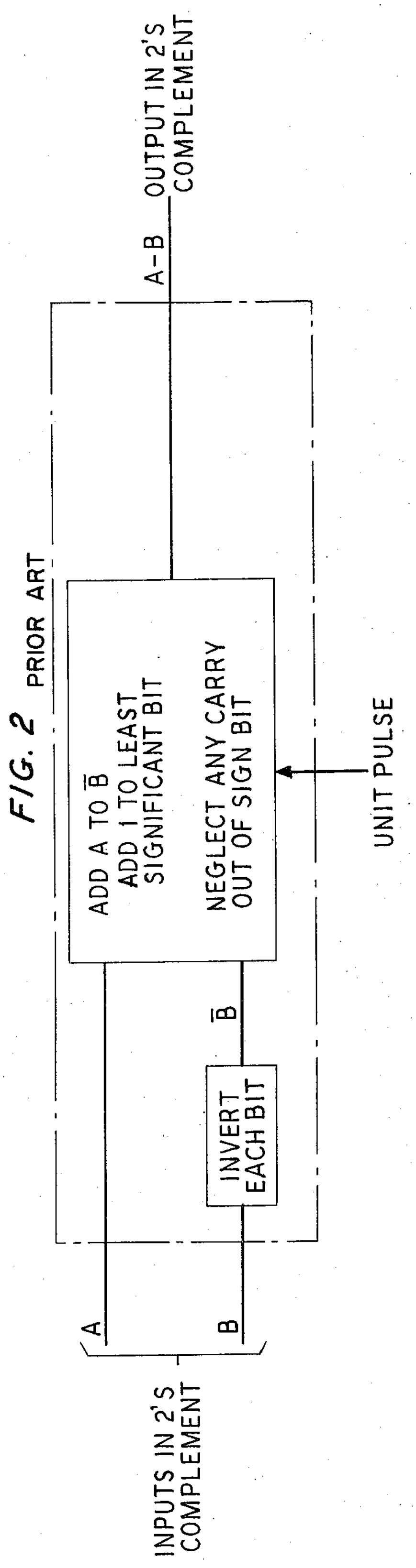
FIG. 2 is a functional diagram of the prior art method of subtracting two numbers in 2's complement representation.
Figure 3:
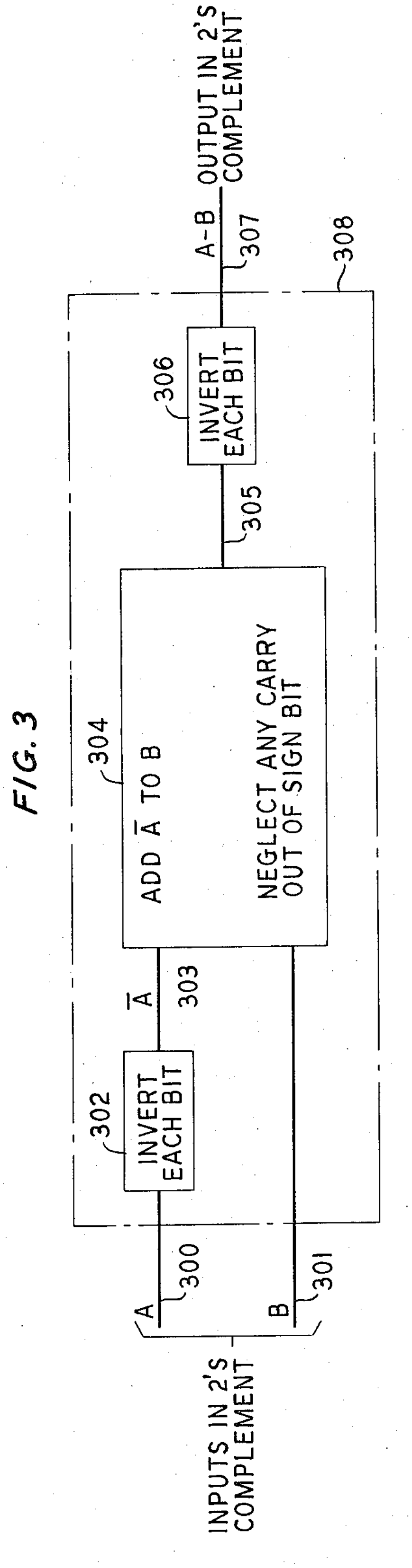
FIG. 3 is a functional diagram of the method of this invention for subtracting two numbers in 2's complement representation.

FIG. 3 shows in block diagram form a new method to perform 2's complement subtraction. Each bit of the minuend is inverted and added to the subtrahend neglecting any carry out of the sign bit. Each bit of the result is inverted to achieve the desired subtraction in 2's complement form.

The following examples demonstrate numerically the simplicity of the method.

EXAMPLE 1

| | |
|---|---|
| Determine A-B where | A=+13 . . . . 0,01101 |
| | B=−7 . . . . 1,11001 |
| step 1: invert A | 1,10010 |
| step 2: add B | 1,11001 neglect carry out of sign bit |
| | 1,01011 |
| step 3: invert result | 0,10100=+20 in 2's complement |

EXAMPLE 2

| | |
|---|---|
| Determine A-B where | A=−7 . . . . 1,11001 |
| | B=+13 . . . . 0,01101 |
| step 1: invert A | 0,00110 |
| step 2: add B | 0,01101 |
| | 0,10011 |
| step 3: invert result | 1,01100=−20 in 2's complement |

EXAMPLE 3

| | |
|---|---|
| Determine A-B where | A=+13 . . . . 0,01101 |
| | B=+7 . . . . 0,00111 |
| step 1: invert A | 1,10010 |
| step 2: add B | 0,00111 |
| | 1,11001 |
| step 3: invert result | 0,00110=+6 in 2's complement |

EXAMPLE 4

| | |
|---|---|
| Determine A-B where | A=+7 . . . . 0,00111 |
| | B=+13 . . . . 0,01101 |
| step 1: invert A | 1,11000 |
| step 2: add B | 0,01101 |
| | 0,00101 neglect carry out sign bit |
| step 3: invert result | 1,11010=−6 in 2's complement |

These examples demonstrate that the simple procedure gives correct results for 2's complement representation of numbers. To further demonstrate the method, informal proofs are shown which exhaust all combinations of positive and negative minuends and subtrahends which could be offered to a subtractor embodying the method.

Let n represent a fixed number of bits which determines the largest magnitude of decimal numbers the subtractor can manipulate. The restriction $2^n > |A| + |B|$ establishes bounds on the size of the minuend A and the subtrahend B. With a modulus of $2^n$, inversion of A yields $2^n - 1 - A$. The 2's complement of A is $2^n - A$. Since the computation is done in modula $2^n$, arithmetic factors of $2^n$ can be subtracted or added, yielding equivalent results.

Case A: A and B positive numbers represented in 2's complement form

| | |
|---|---|
| 1. $\|A\|>\|B$ | |
| step 1: invert A: | $2^n-1-A$ |
| step 2: add B: | $2^n-1-A+B$ |
| step 3: invert: | $2^n-1-[2^n-1-A+B]=A-B$ |
| 2. $\|B\|>\|A\|$ | |
| $A-B \equiv 2^n+(A-B)$ | result is $2^n-(B-A)$ |

Case B: A positive, B negative

| | |
|---|---|
| step 1: invert A | $2^n-1-A$ |
| step 2: add B | $2^n-1-A+(2^n-B)=2^n-1-(A+B)$ |
| step 3: invert | $2^n-1-[2^n-1-(A+B)]=A+B$ |

Case C: A negative, B positive

| | |
|---|---|
| step 1: invert A | $2^n-1-[2^n-A]$ |
| step 2: add B | $2^n-1-[2^n-A-B]$ |
| step 3: invert | $2^n-1-(2^n-1-[2^n-(A+B)])=2^n-(A+B)$ |

Case D: A and B negative

| | |
|---|---|
| 1. $\|B\|>\|A\|$ | |
| step 1: invert A | $2^n-1-[2^n-A]$ |
| step 2: add B | $2^n-1-[2^n-A]+[2^n-B]$ |
| step 3: invert | $2^n-1-(2^n-1-[2^n-A]+[2^n-B])=B-A$ |
| 2. $\|A\|>\|B\|$ | |
| $B-A \equiv 2^n+(B-A)$ | result is $2^n-(A-B)$ |

FIG. 3 shows the invention in simple block diagram form. The minuend A on lead 300 and subtrahend B on lead 301 are presented to the subtractor unit as signals representing bits of 2's complement numbers. Each bit of the minuend A on lead 300 is inverted, the result being $\overline{A}$ on lead 303; $\overline{A}$ on lead 303 and B on lead 301 are added according to the rules of binary arithmetic in adder 304 where the addition is performed ignoring any carries out of the sign bit. Each bit in the output on lead 305 from the adder 304 is inverted by inverter 306 to achieve the desired output, A−B on lead 307 in 2's complement form.

Figure 4:
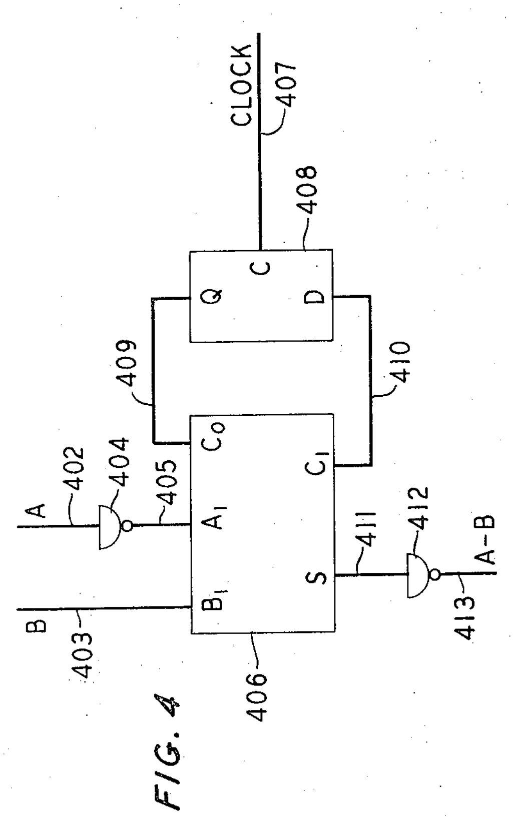
FIG. 4 is a circuit diagram for using this invention in a serial arithmetic application for subtracting two numbers in 2's complement representation.

FIG. 4 shows the invention as it can be used in a serial arithmetic application. Each bit of the minuend A and subtrahend B is serially applied to subtractor input leads 402 and 403. The bits are shifted in serially such that the least significant bit is shifted first. NAND gate 404, commercially available as SN7400 (see *The Integrated Circuits Catalog*, First Edition, Texas Instruments, Inc., reference number CC-401), acts to invert each bit, such that the inverted A bit and the B bit are input into the full adder circuit 406, commercially available as SN7482. A clock pulse triggers a flip-flop circuit 408, commercially available as SN7474, which transmits a carry bit over line 409 to adder 406 if a carry bit from the previous addition was generated. Of course, there will be no carry bit for the least significant bit because the control circuit is cleared of any carry bits once an entire addition has been performed. The output bits from the S lead 411 of the adder circuit are inverted by the NAND gate 412. The resulting serial bits on lead 413 are the corresponding bits of the desired difference between A and B in 2's complement representation.

Figure 5:
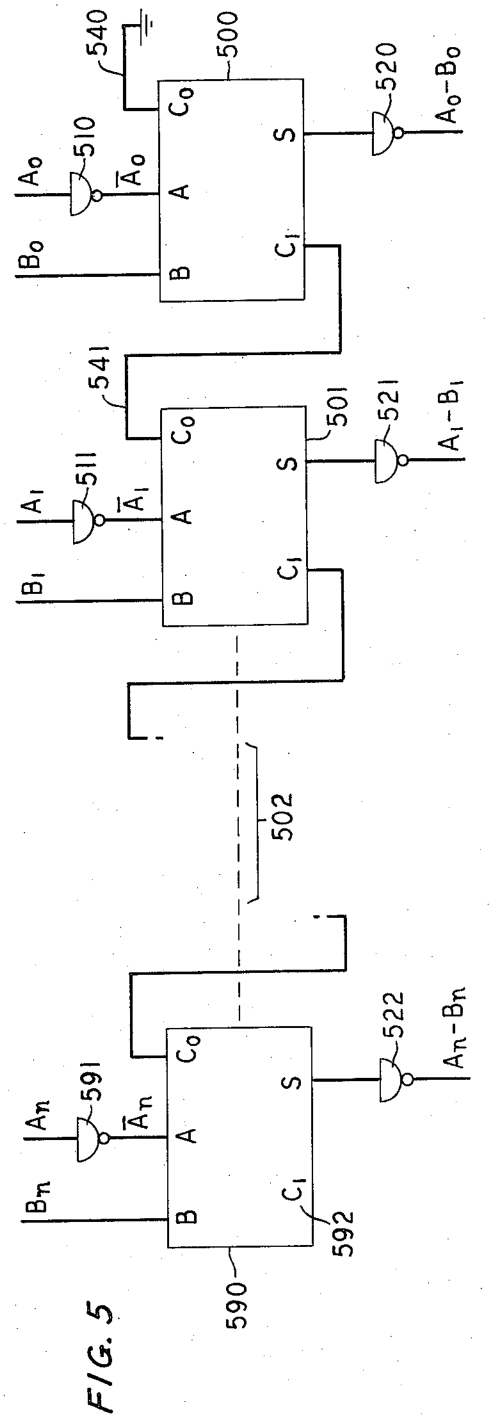
FIG. 5 is a circuit diagram for using this invention in a parallel arithmetic application for subtracting two numbers in 2's complement representation.

FIG. 5 shows the invention as it can be used in a parallel arithmetic application. For n+1 bit words, n+1 full adders, 500 501 . . . 590, are shown where only the least significant and most significant bit adders are shown; other adders and bits are represented by dots 502. Full adders are commercially available as SN7482. Each A bit is inverted with a NAND gate 510 511 . . . 591 and each pair of bits $B_0\bar{A}_0$, $B_1\bar{A}_1$ . . . $B_n\bar{A}_n$ are input on the respective B and A input leads of their respective adders. The least significant bit adder 500 has its carry-in lead connected to ground 540. All subsequent adders have their input carry leads connected to the output carry lead from the previous adder. For example, lead 541 connects the output carry from the $B_0\bar{A}_0$ addition to the input carry for the $B_1\bar{A}_1$ addition. Carries 591 out of the most significant addition stage 590 are ignored. The output of each adder is inverted by another NAND gate 520 521 . . . 522. All NAND gates shown are commercially available as SN7400. The output of the respective NAND gates 520 521 . . . 522 correspond to the respective bits of the desired output number (A-B).

What is claimed is:

1. A serial arithmetic subtractor for 2's complement binary signals comprising:

a serial binary adder circuit;

a source of N minuend signals;

a first inverter circuit interposed between said source of minuend signals and said adder circuit;

a source of N subtrahend signals connected to said adder circuit; and inverting means for inverting only the N least significant signals which result from said adder circuit.

2. A parallel arithmetic subtractor for 2's complement binary signals comprising:

source of N minuend signal bits;

a plurality of binary adder circuits, one such adder circuit provided for each signal bit, the carry-in lead of the adder of the nth stage being connected to the carry-out lead of the *n*-1st stage, where $n =$ 1,1,2, . . . N and represents the order of the signal bit in the minuend or subtrahend;

an inverter circuit interposed between said source of minuend signal bits and each of said respective adder circuits;

a source of N subtrahend signal bits, each corresponding respectively to a minuend signal bit, a connected to said respectively provided adder source; and an inverter circuit connected to the output of each of said adder circuits to invert only the N least significant bits.

3. A method for obtaining a signal indicating the difference between two binary bit streams in 2's complement form comprising the steps of applying the minuend bit stream of N bits to a first inverter circuit;

applying the subtrahend and inverted minuend bit streams each of N bits to an adder circuit;

applying the sum bit stream from said adder to a second inverter circuit; and utilizing only the N least significant bits from said second inverter.

4. Apparatus for subtracting one number from another wherein both numbers are represented by bit streams in signed 2's complement form comprising:

means for inverting each bit of the minuend bit stream of N bits;

means for adding the subtrahend bit stream of N bits to said inverted minuend; and means for inverting only the N least significant bits which results from said adding means.

* * * * *

UNITED STATES PATENT OFFICE
CERTIFICATE OF CORRECTION

Patent No. 3,816,734 Dated June 11, 1974

Inventor(s) Henry T. Brendzel

It is certified that error appears in the above-identified patent and that said Letters Patent are hereby corrected as shown below:

The address of the Assignee should read --Murray Hill, Berkeley Heights, New Jersey--.

Column 1, line 58, change "1,111000" to --1,11000--.
Column 3, line 19, after "0,10100" change "-" to --=--.
Column 3, line 65, change "modula" to --modulo--.
Column 4, line 7, change "| B" to --| B |--.
Column 6, line 5, change "1,1,2" to --0, 1, 2--;
Column 6, line 11, delete "a", second occurrence.

Signed and sealed this 22nd day of October 1974.

(SEAL)
Attest:

McCOY M. GIBSON JR.
Attesting Officer

C. MARSHALL DANN
Commissioner of Patents